United States Patent Office 3,361,740
Patented Jan. 2, 1968

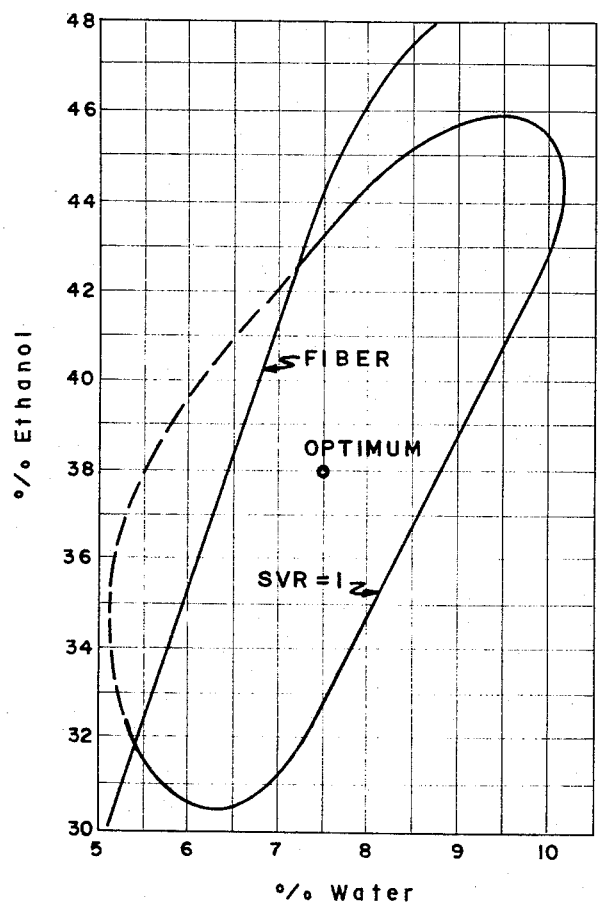

3,361,740
PROCESS FOR MAKING CARBOXYMETHYLCEL-
LULOSE GIVING SOLUTIONS HAVING NON-
THIXOTROPIC CHARACTERISTICS
Roy W. Sommers, Pennsville, N.J., assignor to E. I. du
Pont de Nemours and Company, Wilmington, Del., a
corporation of Delaware
Filed Apr. 27, 1964, Ser. No. 363,016
7 Claims. (Cl. 260—231)

This invention relates to a process for preparing water-soluble and alkali-soluble cellulose ethers wherein the solutions of said ethers are unusally smooth and substantially free of thixotropic characteristics.

Various alkali-soluble and water-soluble cellulose ethers have found numerous commercial applications because of their ability to thicken aqueous solutions. Heretofore, such aqueous colloidal solutions have generally been characterized by marked thixotropy which for some thickening, suspending and stabilizing applications is a desirable and important characteristic. Then, too, such aqueous colloidal solutions have also been characterized by pronounced graininess or granularity and this has not hindered the utilization of such cellulose ethers for many thickening, suspending and stabilizing applications. On the other hand, however, there are various applications, including sizing, film-forming solutions, and others, where the heretofore characteristic granularity and thixotropic behavior of alkali-soluble and water-soluble cellulose ethers have proved to be distinct handicaps, and have hindered or prevented utilization of such cellulose ethers in applications requiring smooth aqueous solutions with very little or no granularity or thixotropy.

Prior methods for making samples of carboxymethyl-cellulose salts which give smooth solutions have required (1) the use of high shear agitation during etherification, (2) utilization of extremely small particles of cellulose as the starting material or (3) required the use of a mixture of two water-miscible diluents in the etherification mixture, as described in British Patent 928,792. The first two expedients are obviously expensive to apply on a commercial scale and the third involves complex solvent recovery procedures and; therefore these processes are commercially unattractive.

An object of this invention is to provide a process for making water-soluble and alkali-soluble carboxymethyl-cellulose. Another object of this invention is to provide a process for making carboxymethylcellulose that is unusually smooth and substantially free from thixotropic characteristics in solution. Another object of this invention is to provide a process for making carboxymethylcellulose that forms smooth solutions on dissolution by an economical process and without resort to complex solvent recovery procedures. Further objects and features of the invention will be apparent from the following detailed description.

It has now been discovered that carboxymethylcellulose can be prepared in a form capable of producing solutions of low thixotropy by conducting the cellulose etherification process in a 3-component, 2 liquid-phase system and carrying out the reaction in each step under specific conditions. Surprisingly, it has been found that operating the etherification procedure under an unique combination of conditions not heretofore known, a carboxymethylcellulose ether is produced that forms smooth solutions substantially free of graininess or granularity.

The process of the present invention comprises the preparation of an alkali metal salt of carboxymethylcellulose wherein cellulose is etherified in the presence of caustic alkali with a compound selected from the class consisting of monochloroacetic acid and the alkali metal salts thereof in a 3-component, 2-phase liquid reaction medium in which one liquid phase consists essentially of a mixture of water and a water-miscible aliphatic alcohol having from 2 to 4 carbon atoms, and the second liquid phase consists essentially of a liquid aromatic hydrocarbon and an additional amount of said water-miscible aliphatic alcohol wherein the alkali cellulose is formed by treating the cellulose with aqueous alkali in said 3-component system at a temperature from about 15 to 40° C. for at least 10 minutes, adding said etherifying agent to said alkali cellulose at a temperature from about 15 to 45° C., maintaining this temperature while mixing for at least 5 minutes, then regulating the temperature to from about 45 to 75° C. until substantially complete consumption of the etherifying agent has occurred, the alcohol content of said total liquid phases being from about 30 to 46% by weight, the weight ratio of water to alcohol being from about 0.15 to 0.24 during said etherification, and the caustic to cellulose ratio before addition of the etherifying agent is from about 0.4 to 1 but never less than 2 moles of caustic per mole of etherifying agent added.

Hereinafter alkali metal salts of carboxymethylcellulose are referred to as CMC.

As pointed out above two types of CMC defined by rheology have been recognized in the past. These have been termed thixotropic CMC and smooth CMC. A material said to be thixotropic if its solutions possess structure which exhibits any one of the following phenomena:

(a) the breakdown of structure upon shearing increases continuously with increased shear rate;

(b) the structure is rebuilt upon rest after previous exposure to shearing;

(c) the breakdown of structure increases continuously with the time during which the material is rapidly agitated. In the case of CMC, this structure is apparently the result of failure to adequately etherify crystalline regions of cellulose. In solution, these ordered regions form gel centers capable of building gel particles sufficiently large to be visible to the naked eye in flowing solutions. Since a product may exhibit any one or all the above properties, the degree of thixotropy cannot be determined by a single measurement nor expressed by a single member. Further, the amount of structure is dependent upon the concentration of solution, the temperature, the previous history of the solution and so forth. Thus, measurements of thixotropy have to be closely standardized and are valid only in the pragmatic sense of relating to end use tests or solution appearance.

So-called smooth CMC, on the other hand, exhibits a very low degree of thixotropy in aqueous solution.

One measure of the degree of thixotropy applicable to high-viscosity materials, i.e., above about 500 centipoises (1% solution) is the ratio of the viscosity in a 3% salt solution viscosity in water (Salt Viscosity Ratio—SVR). With high viscosity of materials, this ratio is very sensitive to the degree of thixotropy. Thus a ratio of 0.9 or higher is obtained with smooth products whereas ratios as low as 0.01 or less are obtained with very thixotropic materials. With medium or low viscosity materials, i.e., those having measured values of viscosity lower than about 1000 centipoises in 2% solution, the measured values of the SVR do not correlate well with end use results or visual appearance and are not, therefore, an appropriate measure of thixotropy for these materials.

The dependence of viscosity with shear rate is also a measurement of thixotropy. This can be defined by high shear slope (HSS). This follows the equation $u=aS^{-n}$ where $u=$viscosity in centipoises, $s=$the r.p.m. of the Brookfield viscometer, $n=$a constant which corresponds to the value of the slope on a log $u$ versus log $s$ plot and $a$ is equal to a constant. For a Newtonian fluid $n$ has a value of 0. For CMC solutions, $n$ increases in magnitude with the degree of thixotropy. The value of $n$ of thixotropic material can be greatly increased by subjecting the solution to higher shear and allowing it to rest before the measurements are taken. The value of $n$ obtained in this manner will be referred to as the HSS. Smooth materials have an HSS below about 0.30 for high viscosity materials and below about 0.45 for medium and low viscosity materials.

In order to prepare smooth CMC, reaction conditions which provide the following effects are selected:

(1) Penetration and swelling of inter- and intracrystalline regions of the cellulose should be as uniform as possible during the steep period and the chloroacetic acid mixing period.

(2) Excessively high reaction rates should not prevail during etherification.

In order to successfully attain these goals it has been found that the following conditions are necessary:

(1) The composition of the total liquid should be from 30 to 46% by weight alcohol with water to alcohol ratios of about 0.15 to 0.24. The alcohol is preferably ethanol and the liquid composition is preferably from 35 to 40% ethanol at a water-ethanol ratio of from 0.18 to 0.21.

(2) The temperature for steeping of the cellulose with alkali should be from 15° to 40° C. for 10 to 60 minutes but preferably from 28° to 33° C. for 30 to 45 minutes. Because on a commercial scale heat is generated by the addition of chloroacetic acid (MCA) to the alkali cellulose the MCA mixing temperature will ordinarily be higher than the steep temperature. The alkali cellulose can be cooled, however, before addition of the MCA. The MCA should be added at a temperature from about 15° to 45° C. and preferably from 25° to 35° C. and mixed with the alkali cellulose for from about 5 to 30 minutes in this temperature range. As the steep temperature is increased the allowable water/alcohol, e.g., ethanol, ratio range is decreased for obtaining products having optimum rheological properties.

(3) The caustic to cellulose ratio should be from about 0.4 to 1.0 and preferably 0.5 to 0.7, but never less than 2 moles per mole of chloroacetic acid used. An increase in caustic permits smooth materials having optimum properties to be made over a wider range of liquid composition. For example, the maximum water to ethanol ratio can be increased from 0.23 at 25% excess caustic to 0.24 at 56% excess caustic.

Reference is now made to the drawing illustrating a preferred embodiment and showing the region of water-ethanol compositions suitable for use in the etherification to give smooth products, i.e., the region lying within the elliptical figure in this region. Compositions lying to the left of the straight line, but within the ellipse, give products which contain some unetherified fiber but which give solutions rheologically classified as smooth.

Typical conditions giving products having optimum rheologically smooth properties are outlined in the table below:

| Percent Alcohol | Water/ Alcohol Ratio | Caustic Cellulose Ratio | Steep Temp. (° C.) | MCA Mix (° C.) | Cellulose Mesh |
|---|---|---|---|---|---|
| 33–43 | <0.23 | 0.58 | 30 | 35 | 60 |
| 38 | <0.20 | 0.58 | 40 | 45 | 60 |
| 38–43 | <0.24 | 0.63 | 30 | 35 | 60 |
| 38 | <0.20 | 0.63 | 30 | 35 | 20 |

In describing a cellulose ether and the processes used in preparing such ether, certain terms have been utilized by the art. Throughout this description, the terms have the following connotation:

Degree of etherification—D.E.—the actual degree of substitution obtained as determined by an analysis of the product, i.e., the average number of ether groups which have been introduced per anhydroglucose unit of the cellulose molecule;

Theoretical degree of etherification—T.D.E.—the number of mols of etherifying agent, added to the reaction mixture, per anhydroglucose unit;

Reaction efficiency—R.E. the ratio of the actual degree of etherification to the theoretical degree of etherification, expressed as precent.

Thus:

$$R.E. = \frac{D.E.}{T.D.E.} \times 100$$

The theoretical degree of etherification thus indicates the molar ratio of the etherifying agent to the cellulose present in the reaction mixture, while the degree of etherification is used in classifying the ether with regard to solubility in water, aqueous alkali solutions, etc.

MCA—monochloroacetic acid.

Steep—process of stirring of cellulose with alkali in 3-component system before addition of etherifying agent.

When liquid compositions are identified by percentages the water includes that added with the cellulose, alcohol and caustic.

Excess caustic—the excess caustic is calculated as follows:

$$\text{excess caustic (percent)} = \frac{100B - 200A}{A}$$

where A is moles MCA used and B is moles caustic used, or similarly to calculate moles of caustic used from the percent excess caustic the formula is $$B = 2A + \frac{\text{percent excess} \times A}{100}$$

The following examples illustrate specific embodiments of the process in accordance with the present invention, the ingredients being given as parts by weight unless otherwise indicated.

*Example 1*

62.5 parts of 60 mesh purified cotton linters (4.2% moisture) are added to 407 parts of ethanol (92.4% by weight) and 427 parts of benzene in a mixer, and agitation commenced, 72.4 parts of aqueous caustic solution (52.5% MaOH) are added over a period of about one minute, and the mixture is steeped at a temperature of 30° C. for 30 minutes. 35.4 parts of solid monochloroacetic acid is then added, and the reaction mixed 10 minutes at 30° C. then maintained at 63° C. for a period of 70 minutes with constant agitation. The excess caustic is neutralized with glacial acetic acid.

The product is filtered and washed three times with 65% aqueous ethanol and once with 92.4% aqueous ethanol, and dried. Upon analysis, the product thus obtained has a D.E. of 0.74. Based on a T.D.E. of 1.01, the reaction efficiency of the process was 73.3%. The solubility of the product in water is excellent, forming a clear solution, a 1% solution having a viscosity of 1908 centipoises. The SVR is 1.34.

Similar results are obtained when toluene, xylene, or a mixture thereof is substituted for benzene.

*Examples 2 through 33*

The following examples are conducted by the procedure of Example 1 using the ingredient ratios and conditions described in the tables. The liquid compositions include all water in the composition including that contained in the cellulose, the water-miscible alcohol and the caustic.

| Example No | 2 | 3 | 4 | 5 | 6 | 7 | 8 | 9 |
|---|---|---|---|---|---|---|---|---|
| Liquid/Cell. Ratio | 14.5 | 14.5 | 14.5 | 11.25 | 12 | 13 | 13 | 13 |
| Type of Cell | Linters | Linters | Linters | Linters | 50% linters/ 50% wood pulp | 50% linters/ 50% wood pulp | 50% linters/ 50% wood pulp | 50% linters/ 50% wood pulp |
| Cellulose Mesh Size | 20 | 20 | 20 | 60 | 60 | 60 | 60 | 60 |
| Slurry Medium: | | | | | | | | |
| Percent C₆H₆ | 49.1 | 49.1 | 49.1 | 54.5 | 54.5 | 54.5 | 55 | 55 |
| Percent EtOH | 43.1 | 43.1 | 43.1 | 38.0 | 38.0 | 38.0 | 38 | 38 |
| Percent H₂O | 7.8 | 7.8 | 7.8 | 7.5 | 7.5 | 7.5 | 7 | 7 |
| T.D.E | 1 | 1 | 1 | 1 | 1 | 1 | 1 | 1 |
| Percent Excess Caustic (NaOH) | 56 | 56 | 56 | 25 | 25 | 25 | 25 | 56 |
| Steep Temp., °C | 25 | 30 | 35 | 30 | 30 | 30 | 30 | 30 |
| Steep Time, min | 30 | 30 | 30 | 10 | 10 | 10 | 10 | 10 |
| MCA: | | | | | | | | |
| Add. Temp., °C | 25 | 30 | 35 | 30 | 30 | 30 | 30 | 30 |
| Mix. Temp., °C | 30 | 35 | 40 | 35 | 35 | 35 | 35 | 35 |
| Mix. Time, min | 10 | 10 | 10 | 10 | 10 | 10 | 10 | 10 |
| Ether. Temp., °C | 63 | 63 | 63 | 63 | 63 | 63 | 63 | 63 |
| Ether. Time, min | 70 | 70 | 70 | 70 | 70 | 70 | 70 | 70 |
| D.E | 0.74 | 0.70 | 0.78 | | | | 0.69 | 0.70 |
| 1% Viscosity | 1,908 | 1,736 | 2,028 | 2,340 | 1,944 | 2,732 | 1,032 | 1,736 |
| SVR | 1.34 | 1.12 | 0.92 | 1.02 | 1.10 | 1.04 | 1.17 | 1.12 |

| Example No | 10 | 11 | 12 | 13 | 14 | 15 | 16 | 17 |
|---|---|---|---|---|---|---|---|---|
| Liquid/Cell. Ratio | 11.25 | 11.25 | 11.25 | 11.25 | 11.25 | 11.25 | 11.25 | 11.25 |
| Type of Cell | Wood pulp | Wood pulp | Wood pulp | Wood pulp | Wood pulp | Wood pulp | Wood pulp | Wood pulp |
| Cellulose Mesh Size | 60 | 60 | 60 | 60 | 60 | 60 | 60 | 60 |
| Slurry Medium: | | | | | | | | |
| Percent C₆H₆ | 61.5 | 60.5 | 59.5 | 55.7 | 55.4 | 55 | 56.7 | 54.5 |
| Percent EtOH | 33.0 | 33.0 | 33.0 | 38.0 | 38.0 | 38 | 38.0 | 38.0 |
| Percent H₂O | 5.5 | 6.5 | 7.5 | 6.3 | 6.6 | 7 | 7.3 | 7.5 |
| T.D.E | 1 | 1 | 1 | 1 | 1 | 1 | 1 | 1 |
| Percent Excess Caustic | 25 | 25 | 25 | 25 | 25 | 25 | 25 | 25 |
| Steep Temp., °C | 30 | 30 | 30 | 30 | 30 | 30 | 30 | 30 |
| Steep Time, min | 30 | 30 | 30 | 30 | 30 | 30 | 30 | 30 |
| MCA: | | | | | | | | |
| Add. Temp., °C | 30 | 30 | 30 | 30 | 30 | 30 | 30 | 30 |
| Mix. Temp., °C | 35 | 35 | 35 | 35 | 35 | 35 | 35 | 35 |
| Mix. Time, min | 10 | 10 | 10 | 10 | 10 | 10 | 10 | 10 |
| Ether. Temp., °C | 63 | 63 | 63 | 63 | 63 | 63 | 63 | 63 |
| Ether. Time, min | 70 | 70 | 70 | 70 | 70 | 70 | 70 | 70 |
| D.E | 0.82 | 0.77 | 0.70 | 0.72 | 0.75 | 0.75 | 0.70 | 0.75 |
| 2% Viscosity | 200 | 230 | 281 | 253 | 240 | 244 | 264 | 266 |
| HSS | | <.15 | <.15 | | <.15 | | <.15 | <.15 |

| Example No | 18 | 19 | 20 | 21 | 22 | 23 | 24 | 25 |
|---|---|---|---|---|---|---|---|---|
| Liquid/Cell. Ratio | 11.25 | 11.25 | 11.25 | 11.25 | 11.25 | 11.25 | 11.25 | 11.25 |
| Type of Cell | Wood pulp | Wood pulp | Wood pulp | Wood pulp | Wood pulp | Linters | Linters | Linters |
| Cellulose Mesh Size | 60 | 60 | 60 | 60 | 60 | 60 | 60 | 60 |
| Slurry Medium: | | | | | | | | |
| Percent C₆H₆ | 53.7 | 53 | 49.7 | 48.6 | 47.6 | 54.5 | 54.5 | 54.5 |
| Percent EtOH | 38.0 | 38 | 43.0 | 42.9 | 42.9 | 38.0 | 38.0 | 38.0 |
| Percent H₂O | 8.3 | 9 | 7.3 | 8.5 | 9.5 | 7.5 | 7.5 | 7.5 |
| T.D.E | 1 | 1 | 1 | 1 | 1 | 1 | 1 | 1 |
| Percent Excess Caustic | 25 | 25 | 25 | 25 | 25 | 25 | 25 | 25 |
| Steep Temp., °C | 30 | 30 | 30 | 30 | 30 | 25 | 35 | 40 |
| Steep Time, min | 30 | 30 | 30 | 30 | 30 | 30 | 30 | 30 |
| MCA: | | | | | | | | |
| Add. Temp., °C | 30 | 30 | 30 | 30 | 30 | 25 | 35 | 40 |
| Mix. Temp., °C | 35 | 35 | 35 | 35 | 35 | 30 | 40 | 45 |
| Mix. Time, min | 10 | 10 | 10 | 10 | 10 | 10 | 10 | 10 |
| Ether. Temp., °C | 63 | 63 | 63 | 63 | 63 | 63 | 63 | 63 |
| Ether. Time, min | 70 | 70 | 70 | 70 | 70 | 70 | 70 | 70 |
| D.E | 0.71 | 0.71 | 0.76 | 0.78 | 0.71 | 0.72 | 0.74 | 0.72 |
| 2% Viscosity | 263 | 279 | 224 | 220 | 200 | | | |
| HSS | <.15 | <.15 | <.15 | <.15 | <.15 | | | |
| 1% Viscosity | | | | | | 2,080 | 2,036 | 2,088 |
| SVR | | | | | | 1.38 | 1.27 | 1.14 |

| Example No | 26 | 27 | 28 | 29 | 30 | 31 | 32 | 33 |
|---|---|---|---|---|---|---|---|---|
| Liquid/Cell. Ratio | 11.25 | 14.5 | 14.5 | 14.5 | 11.25 | 11.25 | 11.25 | 11.25 |
| Type of Cell | Linters | Linters | Linters | Linters | Wood pulp | Wood pulp | Wood pulp | Wood pulp |
| Cellulose Mesh Size | 60 | 20 | 20 | 20 | 60 | 60 | 60 | 60 |
| Slurry Medium: | | | | | | | | |
| Percent C₆H₆ | 45 | 49.1 | 49.1 | 49.1 | 54.5 | 54.5 | 54.5 | 54.5 |
| Percent EtOH | 45 | 43.1 | 43.1 | 43.1 | 38.0 | 38.0 | 38.0 | 38.0 |
| Percent H₂O | 10 | 7.8 | 7.8 | 7.8 | 7.5 | 7.5 | 7.5 | 7.5 |
| T.D.E | 1 | 1 | 1 | 1 | 1 | 1 | 1 | 1 |
| Percent Excess Caustic | 25 | 56 | 56 | 56 | 25 | 25 | 25 | 25 |
| Steep Temp., °C | 30 | 25 | 30 | 35 | 25 | 30 | 35 | 40 |
| Steep Time, min | 30 | 30 | 30 | 30 | 30 | 30 | 30 | 30 |
| MCA: | | | | | | | | |
| Add. Temp., °C | 30 | 25 | 30 | 35 | 25 | 30 | 35 | 40 |
| Mix. Temp., °C | 35 | 30 | 35 | 40 | 30 | 35 | 40 | 45 |
| Mix. Time, min | 10 | 10 | 10 | 10 | 10 | 10 | 10 | 10 |
| Ether. Temp., °C | 63 | 63 | 63 | 63 | 63 | 63 | 63 | 63 |
| Ether. Time, min | 70 | 70 | 70 | 70 | 70 | 70 | 70 | 70 |
| D.E | 0.75 | 0.74 | 0.70 | 0.78 | | 0.74 | 0.75 | 0.74 |
| 1% Viscosity | 1,908 | 1,908 | 1,736 | 2,028 | | | | |
| SVR | 1.13 | 1.34 | 1.12 | 0.92 | | | | |
| HSS | | | | | | | 0.06 | 0.07 |
| 2% Viscosity | | | | | 267 | 266 | 266 | 270 |

Any source of purified cellulose can be used in the process but for practical purposes wood pulp and cotton linters are the readily available commercial sources of cellulose and; therefore, are preferred. Preferably the mesh size of the starting cellulose is greater than 10 and most preferably from 20 to 100 mesh. With coarser materials agitation becomes difficult, higher liquid:solid ratios must be used and a greater quantity of caustic must be used. The coarser materials can be utilized provided the slurry can be adequately agitated.

The total liquid to cellulose ratio should be such that the slurry can be easily agitated. In general, this ratio will be about from 4 to 1 to 20 to 1 and preferably about from 9 to 1 to 15 to 1.

The aromatic hydrocarbons used as a part of the "liquid aromatic" medium are liquids boiling above about 50° C. The preferred hydrocarbons are benzene, toluene and xylenes and mixtures thereof. Of course, other aromatic liquid hydrocarbons of the benzene series such as ethylbenzene, cumene, m-butylbenzene, m-amylbenzene, p-diethylbenzene, isohexylbenzene, 1,2,4-triethylbenzene and the like are also suitable.

For the organic, water-miscible component of the liquid medium of the present invention, we prefer to use an aliphatic alcohol having from two to four carbon atoms, for example, ethanol, propanol or butanol. The preference is based on the availability of these liquids, their relatively low cost, and the ease with which they can be removed and recovered from the product. Ethanol is the preferred alcohol.

The properties of the alkali salts of carboxymethylcellulose made by this invention, such as color, viscosity and physical form can be modified at will by suitable modifications to the process, which, however, do not change the basic process. For example, hydrogen peroxide or other oxidizing agents can be added during or after etherification to lower the viscosity of the solutions of the products. Water can be added to the slurry after etherification is complete to alter the physical form of the product and make it more dense.

Purification and recovery of the products of the invention is conventional, and a suitable method is described in U.S. Patent 2,976,278.

By following the procedure described herein employing an unique combination of conditions, smooth solutions of alkali salts of carboxymethylcellulose can be prepared. The resulting carboxymethylcellulose product exhibits in this form superior properties and makes it particularly adaptable in many applications requiring a cellulose ether substantially free of granular particles, for example, in sizing and film-forming applications.

I claim:

1. A process for the manufacture of alkali metal salts of carboxymethylcellulose giving aqueous solutions of low thioxtropy which comprises etherifying cellulose with a compound selected from the group consisting of monochloroacetic acid and the alkali metal salts thereof in a 3-component, 2-liquid phase reaction medium in which one phase consists essentially of a mixture of water and a water-miscible aliphatic alcohol having from 2 to 4 carbon atoms and the second liquid phase consists essentially of a liquid aromatic hydrocarbon and an additional amount of said water-miscible alcohol wherein alkali cellulose is formed by treating the cellulose with aqueous alkali in said 3-component system at a temperature from about 15° C. to 40° C. for at least 10 minutes, adding said etherifying agent to said alkali cellulose at a temperature from about 15° C. to 45° C., maintaining this temperature while mixing for at least 5 minutes, then regulating the temperature to from about 45° C. to 75° C. until substantially complete consumption of the etherifying agent has occurred, the alcohol content of the total liquid phases being from about 30 to 46% by weight, the weight ratio of water to alcohol being from about 0.15 to 0.24 during said etherification and the caustic-to-cellulose ratio before addition of the etherifying agent is from about 0.4 to 1.0 but never less than 2 moles of caustic per mole of etherifying agent.

2. The process according to claim 1 wherein the water-miscible alcohol is ethanol.

3. The process according to claim 1 wherein the aromatic hydrocarbon is benzene.

4. The process according to claim 1 wherein the aromatic hydrocarbon is toluene.

5. A process for the manufacture of alkali metal salts of carboxymethylcellulose giving aqueous solutions of low thioxtropy which comprises etherifying cellulose with a compound selected from the group consisting of monochloroacetic acid and the alkali metal salts thereof in a 3-component, 2-liquid phase reaction medium in which one phase consists essentially of a mixture of water and ethanol and the second liquid phase consists essentially of benzene and an additional amount of said ethanol wherein alkali cellulose is formed by treating the cellulose with aqueous alkali in said 3-component system at a temperature from about 15° to 40° C. for at least 10 minutes, adding said etherifying agent to said alkali cellulose at a temperature from about 15° C. to 45° C., maintaining this temperature while mixing for at least 5 minutes, then regulating the temperature to from about 45° C. to 75° C. until substantially complete consumption of the etherifying agent has occurred, the alcohol content of the total liquid phases being from about 30 to 46% by weight, the weight ratio of water to alcohol being from about 0.15 to 0.24 during said etherification and the caustic-to-cellulose ratio before addition of the etherifying agent is from about 0.4 to 1.0 but never less than 2 moles of caustic per mole of etherifying agent.

6. The process according to claim 5 wherein the ethanol content of the total liquid phases is from about 35 to 40% by weight and the weight ratio of water to ethanol is from about 0.18 to 0.21.

7. The process according to claim 5 wherein the caustic is sodium hydroxide.

References Cited

UNITED STATES PATENTS 2,976,278   3/1961   Paddison et al. _____ 260—231

FOREIGN PATENTS 27,433   6/1930   Australia.

JAMES A. SEIDLECK, *Primary Examiner.*

DONALD E. CZAJA, *Examiner.*

R. W. MULCAHY, *Assistant Examiner.*